United States Patent [19]

Brouwer et al.

[11] 4,068,216

[45] Jan. 10, 1978

[54] BULB OUTAGE WARNING SYSTEM

[75] Inventors: Frans Brouwer, Glencoe; Francis E. Ferrari, La Grange Park, both of Ill.

[73] Assignee: Stewart-Warner Corporation, Chicago, Ill.

[21] Appl. No.: 707,386

[22] Filed: July 21, 1976

Related U.S. Application Data

[62] Division of Ser. No. 462,632, April 22, 1974, Pat. No. 3,987,424.

[51] Int. Cl.$^2$ .................... H04Q 1/20; H03K 21/36
[52] U.S. Cl. .................... 340/168 R; 328/109; 328/138; 340/251
[58] Field of Search ............... 340/168 R, 251, 168 B; 235/92 CA; 328/140, 138, 148, 149, 48, 55, 109, 111

[56] References Cited

U.S. PATENT DOCUMENTS

| | | | |
|---|---|---|---|
| 3,852,713 | 12/1974 | Roberts et al. | 340/164 R |
| 3,939,413 | 2/1976 | Milkovic | 328/140 |

*Primary Examiner*—Donald J. Yusko
*Attorney, Agent, or Firm*—McDougall, Hersh & Scott

[57] ABSTRACT

A warning system for detecting a burned out or defective bulb for a motor vehicle is disclosed. A transmitting circuit is connected to detect current flow through the bulb to be monitored. Failure of the bulb to draw current causes the transmitting circuit to produce a series of small voltage pulses on the battery line. These pulses are detected by a receiving circuit which causes an outage indicator light to be illuminated.

5 Claims, 4 Drawing Figures

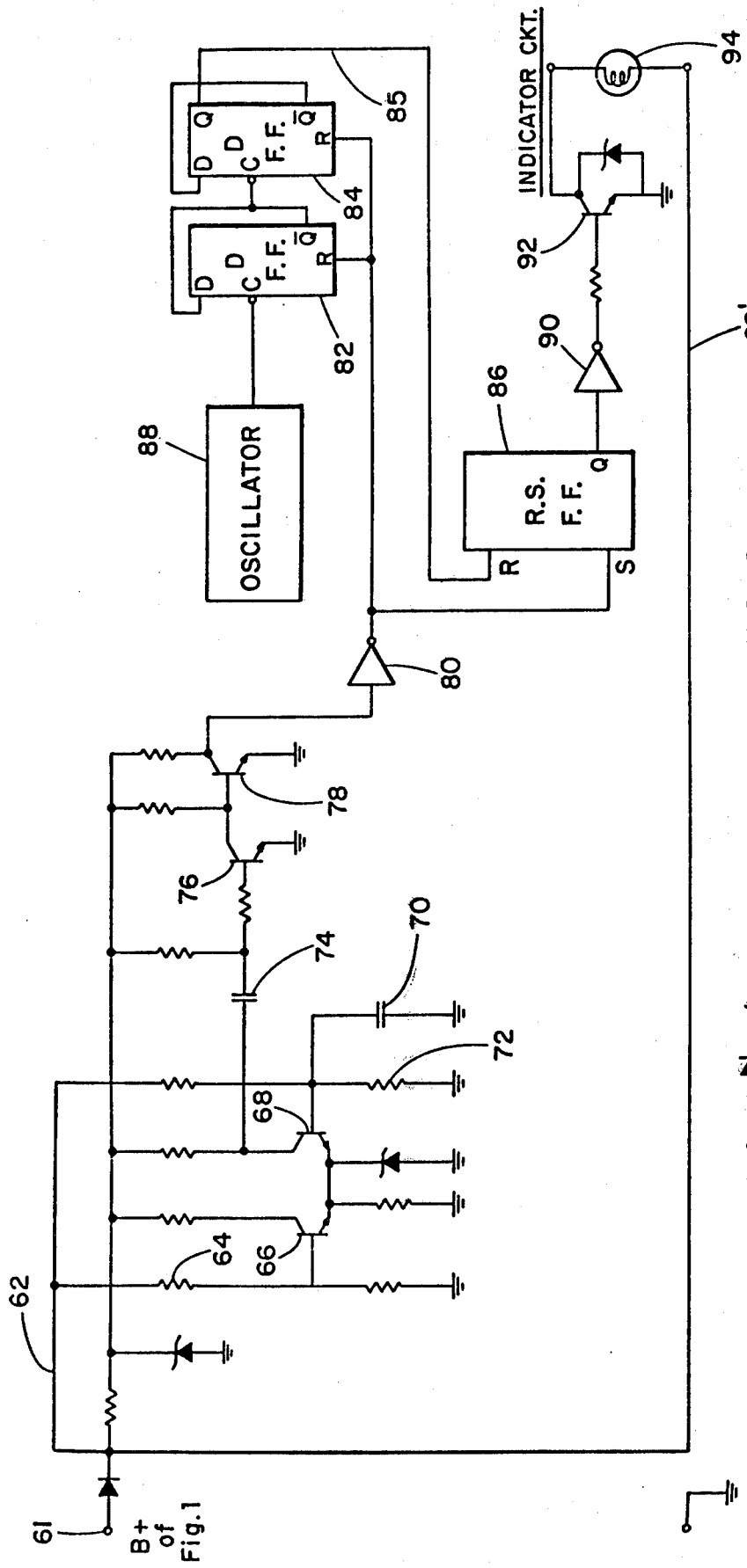
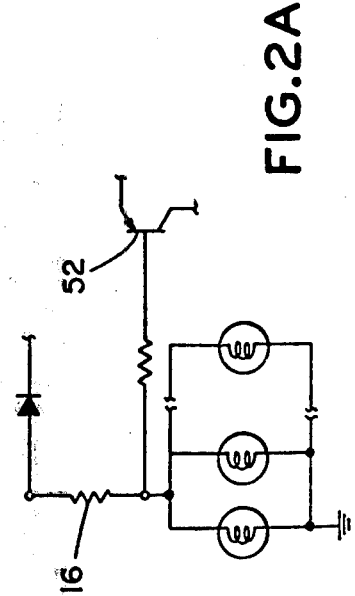
FIG.3
FIG.2A

BULB OUTAGE WARNING SYSTEM

This is a division, of application Ser. No. 462,632 filed Apr. 22, 1974 now U.S. Pat. No. 3,987,424.

BACKGROUND OF THE INVENTION

This invention relates to the field of bulb outage warning systems. More particularly, it relates to the provision of means for informing the operator of a motor vehicle such as a truck, automobile, tractor machinery, etc. that one or more light bulbs associated with the vehicle's electrical system are inoperative. Typically the bulbs which would be monitored according to the present invention would be the headlights, tail lights, directional indicators, backup and parking lights.

In the absence of such a monitoring circuit, it is difficult for an operator to determine that one or more of these lights are inoperative while the vehicle is in operation. Further, even when the vehicle is parked, it is necessary that the operator actuate the light from inside and then go outside and make an inspection or that a second person be employed for this purpose. In the case of turn signals, when one of the bulbs goes out, the flasher usually stops flashing to indicate that a bulb is defective. However, even in this situation, a monitoring system as presently disclosed is desirable in that it is otherwise impossible to determine which end of the vehicle has the defective bulb.

It is accordingly an object of the present invention to provide a bulb outage monitoring system which will detect the failure of one or more filaments of a light bulb.

It is a further object of the present invention to provide a bulb monitoring system for a motor vehicle which utilizes the vehicle's electrical system for transmitting the detection of a bulb outage.

It is another object of the present invention to provide a monitoring system which will alert the operator of the vehicle when one or more lamp filaments of his vehicle are inoperative.

It is yet another object of the present invention to provide a bulb outage monitoring system utilizing microcircuit technology so as to minimize costs.

Other objects and advantages of the invention will become apparent from the remaining portion of the specification.

BRIEF DESCRIPTION OF THE DRAWINGS

FIG. 2-A is a modification of the FIG. 2 circuit to accommodate two or more filaments.

FIG. 3 is a schematic diagram of a circuit for receiving an indication of an outage and for illuminating a visual indicator in response thereto.

DETAILED DESCRIPTION

Figure 1:
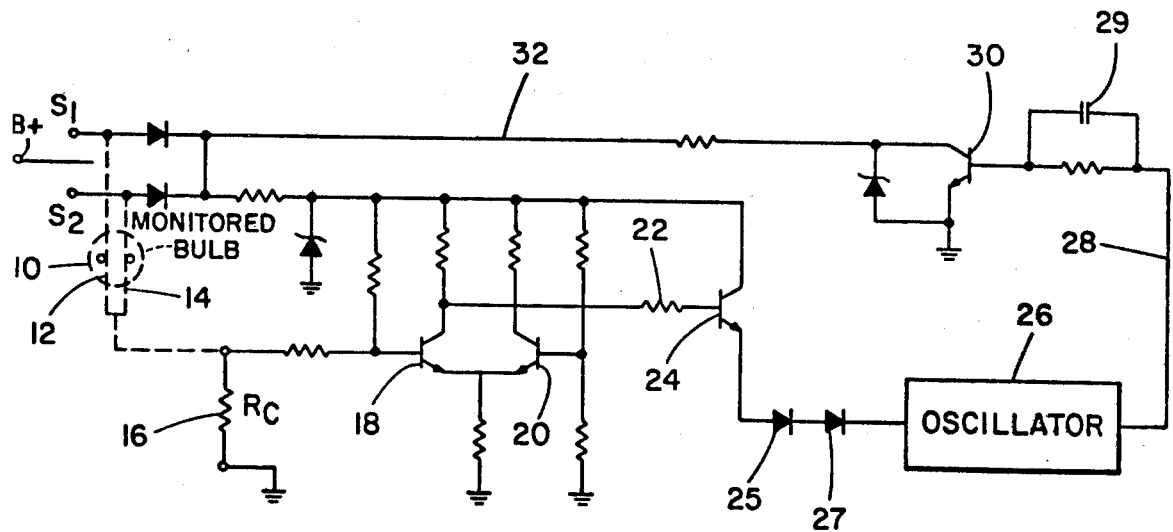
FIG. 1 is a schematic diagram of a circuit for detecting a bulb outage and transmitting an indication thereof.

Referring now to FIG. 1, a dual filament bulb such as a headlight bulb 10 is connected from a vehicle's positive battery terminal to the outage transmitter according to a first embodiment. The bulb 10 has two filaments 12 and 14 both of which are connected to one end of a resistor 16. The other end of resistor 16 is connected to ground. Resistor 16 is desirably on the order of approximately 0.05 to 0.1 Ohms and is utilized to sense current through the filaments.

A pair of transistors 18 and 20 are connected as a differential amplifier having the appropriate biasing resistors as shown. The output from the differential pair is taken on the collector of transistor 18 and provided via resistor 22 to an emitter follower transistor 24. The emitter follower transistor 24 is connected to an oscillator 26 indicated by the dashed lines.

This oscillator may be constructed in a manner well known in the art and, for example, an RCA 4011AE quad 2 input Nand gate integrated circuit may be employed. The oscillator will desirably produce an output frequency on the order of 200 K Hz, although other frequencies in the range of 10 K Hz to 50 M Hz could be employed. The output of the oscillator is provided on line 28 through a D.C. speedup capacitor 29 to a transistor 30. Transistor 30 is provided to obtain the desired gain and/or impedance matching to the vehicle's electrical system. The collector of transistor 30 is connected to the positive terminal of the vehicle's electrical system via line 32.

Considering operation of the circuit shown in FIG. 1, either filament 12 or 14 of the bulb 10 is connected to the plus terminal of a battery. If the filament is good, current will flow from the battery through the filament and the resistor 16 to the negative or ground terminal. This current flow through the resistor 16 produces a voltage drop thereacross maintaining transistor 18 in the on condition. Transistor 20 also conducts, but less than transistor 18. Conduction of transistor 18 maintains its collector at a small voltage. Transistor 24, an emitter follower, thus conducts very slightly. The small voltage appearing at the emitter of transistor 24 is then dropped through the series diodes 25 and 27 to approximately 0 volts. Under these circumstances, the oscillator 26 remains inactive and no signal is transmitted by the circuit.

Should the filament being monitored fail, there will be no voltage drop across the resistor 16 and transistor 18 will turn off. Accordingly, a higher voltage will be present on its collector. This voltage, typically 8-10 volts, is effective for turning on transistor 24. Transistor 24 then initiates operation of the oscillator 26.

The oscillator desirably produces A.C. signals or pulses in the 200 K Hz frequency range. These signals or pulses are applied via line 28 and capacitor 29 to the base of transistor 30. Each pulse is effective for switching the transistor 30 on to produce an output voltage pulse on the line 32, the positive terminal of the battery. This output voltage pulse is typically on the order of 0.1 volts and thus constitutes a small A.C. ripple on a typical 12-volt D.C. electrical system of a motor vehicle. In the manner to be described subsequently, this A.C. ripple is detected by the circuit of FIG. 3, amplified and utilized to light an indicator on the dashboard of the vehicle, indicating the condition of a burned out filament.

Figure 2:
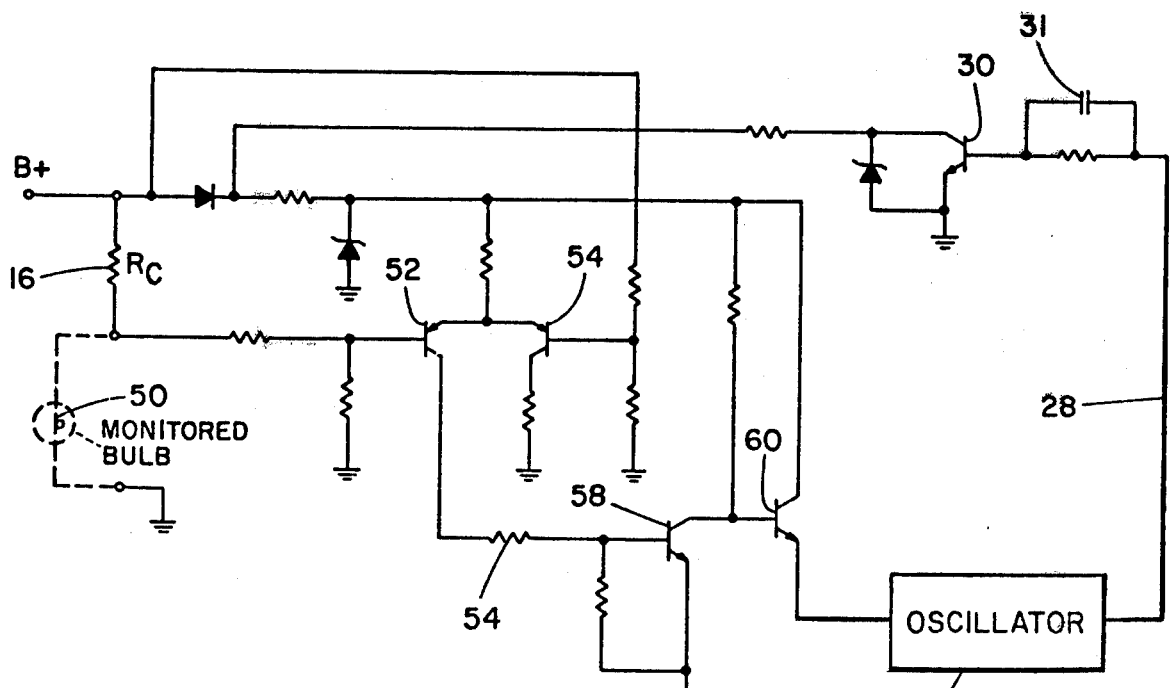
FIG. 2 is an alternate embodiment of a detecting circuit.

Referring now to FIG. 2, a second embodiment of a transmitter according to the present invention is disclosed. In this figure, those elements which are common to the circuit of FIG. 1 have been given identical numbers for ease of discussion. This circuit is adapted for monitoring a single filament lamp. Additionally, it is designed so that the current sensing resistor 16 is located between the positive voltage supply and the filament. In the circuit of FIG. 1, the current sensing resistor was located between the filament and ground. The circuit of FIG. 1 thus possesses the capability of monitoring any one of several filaments. It is noted, however, that the FIG. 1 circuit can be utilized for a single filament and vice versa, the FIG. 2 circuit, which will now be described, can be modified as shown in FIG. 2-A to monitor more than one filament.

In the circuit of FIG. 2, a filament 50 to be monitored, is connected to the positive terminal of the battery 52 through the current sensing resistor 16. The other end of the filament is grounded. Connected to the midpoint between the resistor 16 and the filament 50 is the base of transistor 52. The emitter of transistor 52 is tied to the emitter of transistor 54 and these two transistors form a differential pair as in the circuit of FIG. 1. It should be noted, however, that in this embodiment the differential pair are PNP transistors while the FIG. 1 embodiment employed NPN transistors. Connected to the collector of transistor 52, via a resistor 56, is the base of a transistor 58. In turn, the base of transistor 60 is connected to the collector of transistor 58. Transistor 60 is an emitter follower and operates the oscillator 26 when turned on. As in the circuit of FIG. 1, when the oscillator 26 is energized, it causes switching of a transistor 30 via line 28 to produce a small voltage ripple on the order of 0.1 volts on the positive battery cable.

Considering the operation of the circuit of FIG. 2, when current is flowing through resistor 16 and filament 50 to ground, a voltage drop is maintained on the base of transistor 52 keeping it on. The voltage on the collector of transistor 52 is high enough to keep transistor 58 on. When transistor 58 conducts, it shorts the base of transistor 60 to ground. Transistor 60 therefore remains in its nonconducting state and the oscillator 26 remains off.

Should filament 50 break or fail, transistor 52 will turn off. In turn, transistor 58 will cease conduction. Under these conditions, a voltage will be present on the base of transistor 60 effective for turning it on to initiate operation of the oscillator 26 to operate the switching transistor 30.

Referring now to FIG. 2-A, a modification of the circuit of FIG. 2 to accommodate two or more filaments is shown. In this embodiment, two or more filaments are simultaneously monitored as opposed to the FIG. 1 dual element circuit where only one element at a time is being monitored. The modification shown in FIG. 2-A places the filaments to be monitored in parallel between the current sensing resistor and ground. When any one of the filaments fails, the voltage drop applied to the base of transistor 52 of FIG. 2 will decrease. By appropriately setting the threshold levels for transistor 52, failure of one of a number of parallel filaments can be detected.

When any one of these filaments fails, the circuit will produce the voltage pulses detected by the FIG. 3 circuit. While this alternate embodiment will not indicate precisely which filament has failed, it is a desirable alternative where the filaments being monitored are for bulbs of minor importance with regard to safety, as for example, running lights, backup lights, parking lights and the like. This embodiment has the advantage that one circuit can be used to monitor a greater number of filaments thereby to reduce the cost of a complete monitoring system.

Referring now to FIG. 3, the circuit for detecting the presence of a bulb outage from one of the transmitters of FIGS. 1, 2 or 2-A is shown. The terminal 60 is connected to the positive battery terminal of the vehicle. Voltage is applied via line 62 and resistor 64 to the base of transistor 66. A second transistor 68 has its emitter connected to the emitter of transistor 66 to form a differential amplifier pair. The base of transistor 68 is connected to a capacitor 70 and a resistor 72 is parallel. The other ends of the capacitor and resistor are grounded.

Thus the A.C. signal on line 62 is amplified in the differential transistor pair 66 and 68 by feeding it through the base of 66 and by preventing it from feeding simultaneously through the base of transistor 68 which is blocked by capacitor 70. The Zener diodes shown are provided for transient protection only.

The output of the differential transistor pair is an A.C. signal conveniently described as a pulse train and which corresponds to the detected pulses but isolated from the vehicle's electrical system. This output, taken on the collector of transistor 68, is provided through a D.C. blocking capacitor 74 to the base of transistor 76. Transistors 76 and 78 constitute an amplification section effective for amplifying and for shaping the pulses into a square wave. For example only, if the input pulses at terminal 60 are approximately 0.1 volt, the output on the collector of transistor 78 is typically a 12-volt square wave pulse. The output of transistor 78 is provided via an inverting amplifier 80 to the reset inputs of a pair of D-type flip-flops 82 and 84 connected as a 2-bit counter. This output is also provided to the set terminal of an R-S type flip-flop 86. The flip-flops 82 and 84 receive an input from an oscillating circuit 88. The oscillator 88 operates desirably in the same frequency range as the oscillator of the circuits for FIGS. 1 and 2. The oscillator 88 and the flip-flops 82 and 84 comprise a digital high pass filter to prevent false tripping of the indicator circuit due to noise in the electrical system. The digital filter prevents random pulses from causing the bulbout indicator to be actuated, as will be described.

The output of R-S flip-flop 86 is taken from the $\overline{Q}$ terminal and applied through an inverting amplifier 90 to the base of transistor 92. Transistor 92 acts as a switch for completing a circuit from the positive line of the battery 62 through an indicator light 94 to the emitter of transistor 92 which is grounded.

When a voltage pulse is applied to the set input of R-S flip-flop 86, it is effective for causing the indicator light 94 to be actuated. In order that random noise pulses present in a vehicle's electrical system do not cause the indicator lamp to be actuated, the digital filter is provided.

The filter utilizes the oscillator 88 as an input to D-type flip-flop 82 causing the flip-flop to alternately set and reset. The output of flip-flop 82 is connected to the clock input of flip-flop 84. Thus, every second pulse from the oscillator produces an output on line 85. The output on line 85 will reset the R-S flip-flop 86. Thus a random pulse on the battery line can actuate the indicator light 94 for only a short period of time before the flip-flop 86 is reset. When a random pulse does occur, the indicator light starts to energize but a reset pulse on line 85 resets the flip-flop 86 for deenergizing the indicator light before it becomes visible to the human eye.

When an actual bulb outage is detected, a continuous train of voltage pulses will be received and applied via the inverting amplifier 80 to the set line of the flip-flop 86. The first pulse so applied will be effective for initiating energization of the indicator light 94 and for resetting the flip-flops 82 and 84. That is, if the flip-flops are at 2 when a pulse is applied to their reset, they reset to 0 and must again count to 2 before producing an output on line 85. It will be apparent that when a train of pulses representing an actual bulb outage is present, the flip-flops 82 and 84 are inhibited or prevented from counting. Thus flip-flop 86 is set and maintained in the set condition by the train of pulses. The indicator light 94 is therefore energized and maintained in that condition. When the bulb outage is remedied, the pulse train will cease, allowing the flip-flops 82 and 84 to begin counting for resetting the flip-flop 86 to deenergize the indicator light.

While we have shown and described embodiments of this invention in some detail, it will be understood that this description and illustrations are offered merely by way of example, and that the invention is to be limited in scope only by the appended claims.

We claim:

1. A receiving circuit for producing an output in response to a signal pulse train imposed on a voltage supply line comprising:
    a. means for detecting the presence of pulses on said supply line,
    b. indicating means,
    c. control means responsive to said pulses for initiating operation of said indicating means, and
    d. digital filter means for discriminating between no pulses, random pulses, and said train of pulses for inhibiting said control means when no pulses or random pulses are detected.

2. The receiving circuit of claim 1 wherein said detecting means includes:
    a differential amplifier transistor pair wherein one transistor of said pair is controlled by the detected pulses.

3. The receiving circuit of claim 1 wherein said control means includes:
    a. a flip-flop receiving said pulses and producing an output.

4. The receiving circuit of claim 1 wherein said digital filter means includes:
    a. an oscillator producing a series of pulses; and
    b. a counter receiving the series of pulses from said oscillator and producing an output for inhibiting said control means.

5. The circuit of claim 4 further including:
    means applying said detected pulses to said counter for initializing said counter whereby a train of detected pulses will prevent said counter from inhibiting said control means, while random detected pulses will only delay the inhibiting of said control means.

* * * * *